US011221919B2

(12) United States Patent
Jacob

(10) Patent No.: US 11,221,919 B2
(45) Date of Patent: Jan. 11, 2022

(54) INDEX BASED SMART FOLDER SCAN SYSTEM AND METHOD FOR CLOUD-COMPUTING PROVIDER NETWORK

(71) Applicant: DRUVA INC., Sunnyvale, CA (US)

(72) Inventor: Rono Abraham Jacob, Pune (IN)

(73) Assignee: Druva Inc., Sunnyvale, CA (US)

( * ) Notice: Subject to any disclaimer, the term of this patent is extended or adjusted under 35 U.S.C. 154(b) by 625 days.

(21) Appl. No.: 16/047,213

(22) Filed: Jul. 27, 2018

(65) Prior Publication Data

US 2019/0370116 A1 Dec. 5, 2019

(30) Foreign Application Priority Data

May 30, 2018 (IN) .............................. 201841020214

(51) Int. Cl.
*G06F 15/16* (2006.01)
*G06F 11/14* (2006.01)
(52) U.S. Cl.
CPC ...... *G06F 11/1448* (2013.01); *G06F 2201/80* (2013.01); *G06F 2201/84* (2013.01)
(58) Field of Classification Search
None
See application file for complete search history.

(56) References Cited

U.S. PATENT DOCUMENTS

| 8,204,860 B1* | 6/2012 | Ferguson | G06F 16/188 |
| | | | 707/639 |
| 8,332,354 B1* | 12/2012 | Chatterjee | G06F 11/1461 |
| | | | 707/624 |
| 8,386,446 B1* | 2/2013 | Pasupathy | H04L 67/1097 |
| | | | 707/696 |
| 9,576,038 B1* | 2/2017 | Huang | G06F 16/27 |
| 2013/0124798 A1* | 5/2013 | Aszmann | G06F 11/1076 |
| | | | 711/114 |

(Continued)

*Primary Examiner* — Alex Gofman
(74) *Attorney, Agent, or Firm* — BakerHostetler

(57) ABSTRACT

A system and method for an index-based smart scan for a cloud-computing provider network is provided. The system includes a memory having computer-readable instructions stored therein and a snapshot repository configured to store a plurality of snapshots of a plurality of block storage volumes. Each of the plurality of block storage volumes is configured to perform volume based block storage operations for the cloud-computing provider network. The system further includes a processor communicatively coupled to the snapshot repository. The processor is configured to access contents of each of the plurality of snapshots. Each of the plurality of snapshots includes a point-in-time capture of the respective block storage volume. In addition, the processor is configured to perform a full scan of each of the plurality of snapshots to identify one or more files of the respective block storage volume. The processor is further configured to generate a folder index table for each of the files based upon the scan. The folder index table includes a listing of the file path and an associated modification time for each of the files. Furthermore, the processor is configured to update the folder index table over a pre-determined period of time and locate a file in the plurality of block storage volumes based on the folder index table.

17 Claims, 5 Drawing Sheets

(56) References Cited

U.S. PATENT DOCUMENTS

2016/0042090 A1* 2/2016 Mitkar ................ G06F 11/1448
707/649
2018/0060037 A1* 3/2018 Johnson .................... G06F 7/08
2019/0163763 A1* 5/2019 Pandey ................ G06F 11/301

* cited by examiner

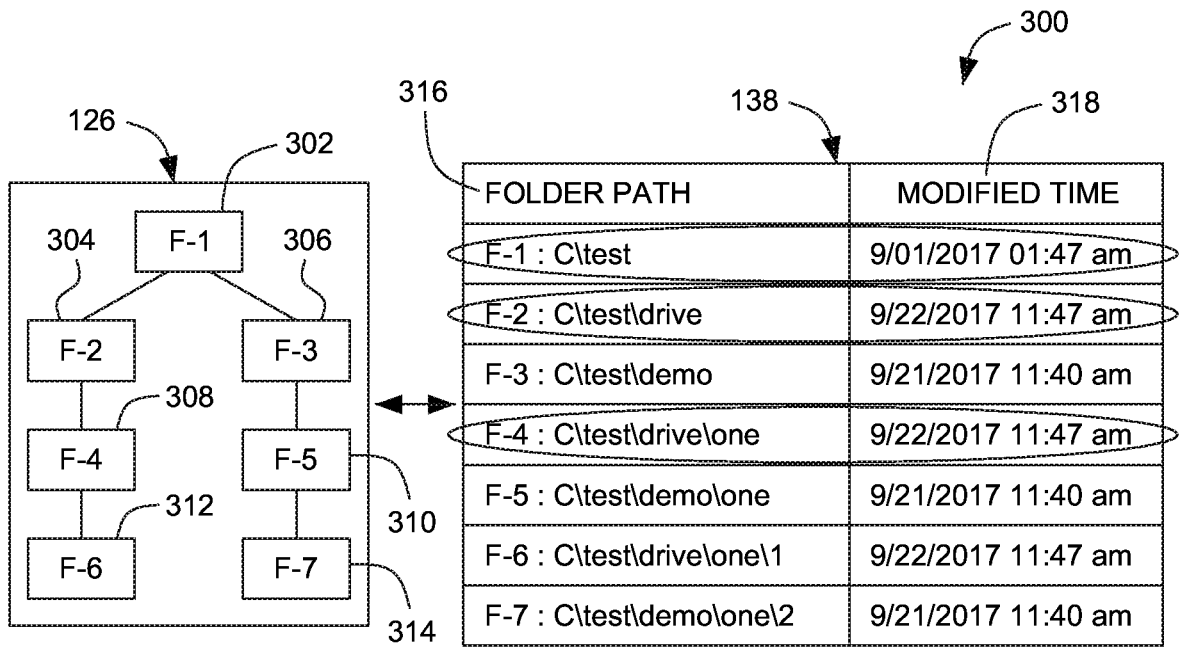
FIG. 3
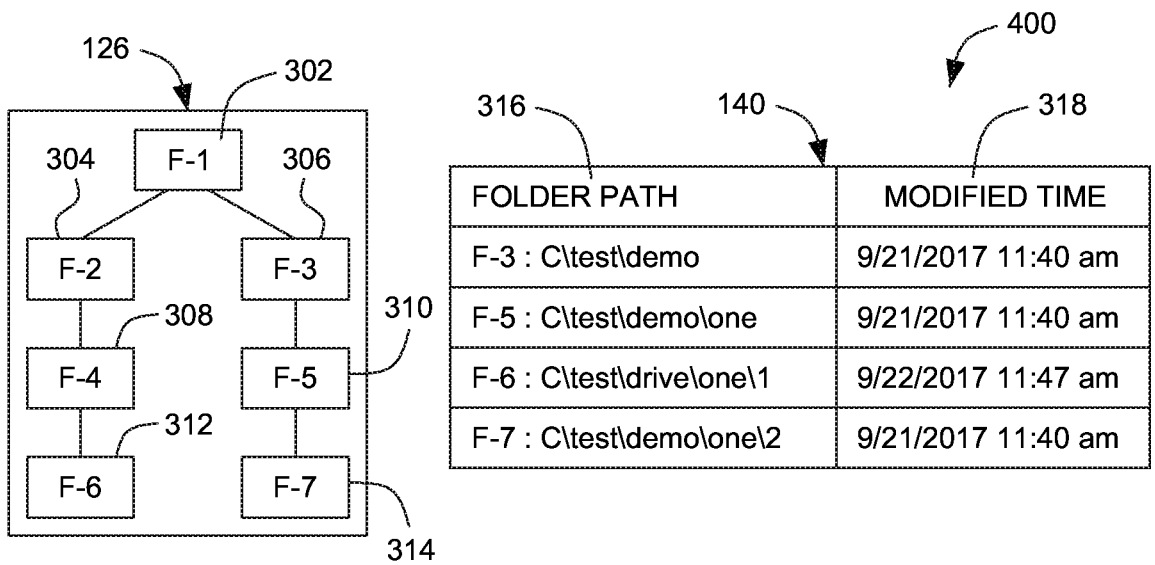
FIG. 4-A

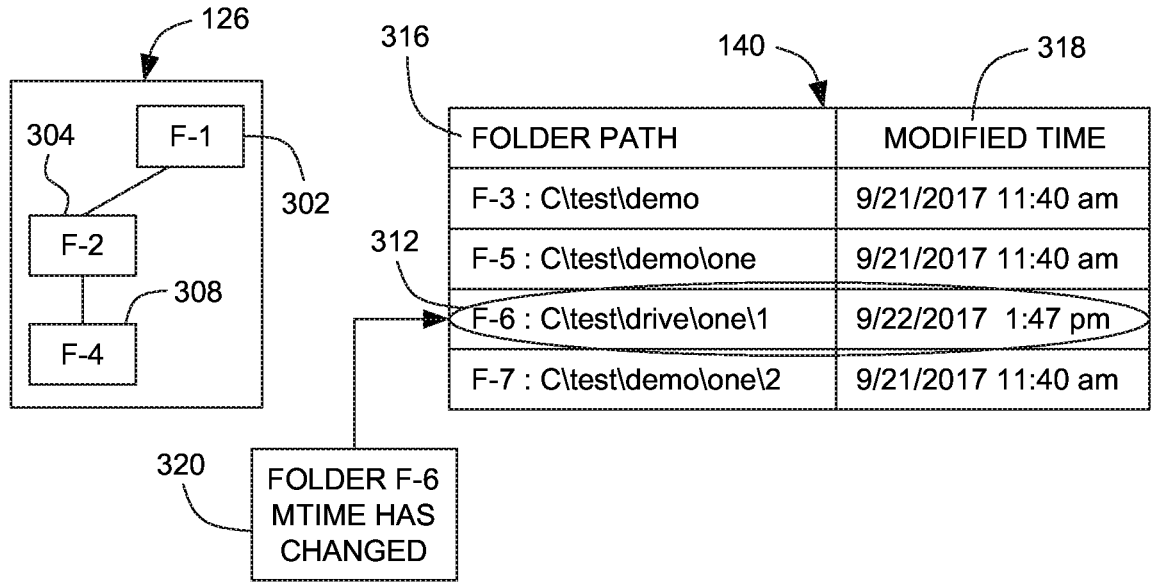
FIG. 4-B
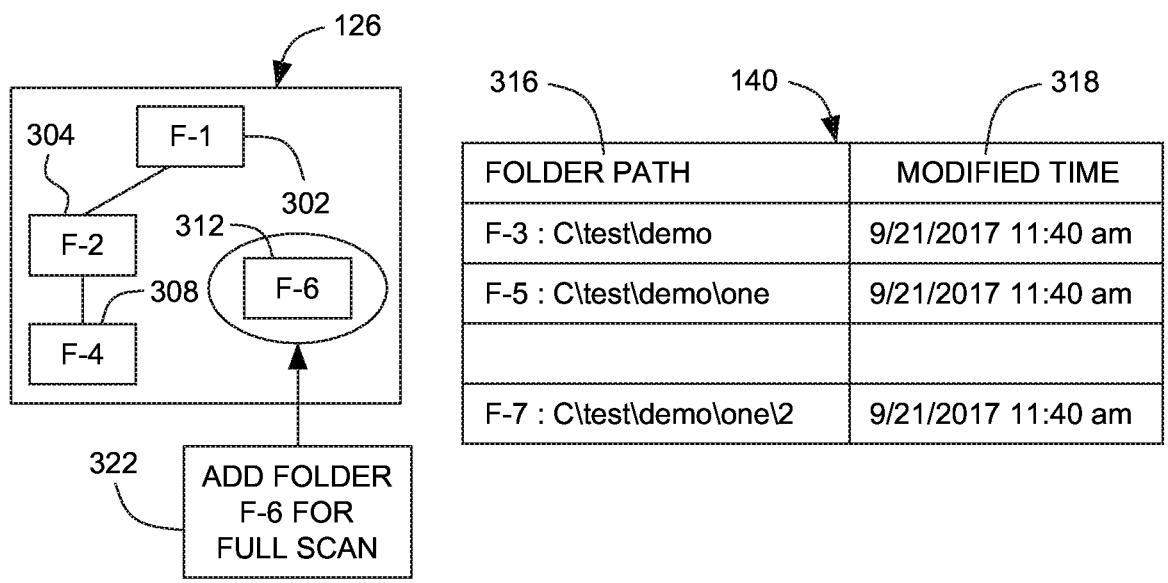
FIG. 4-C

INDEX BASED SMART FOLDER SCAN SYSTEM AND METHOD FOR CLOUD-COMPUTING PROVIDER NETWORK

PRIORITY STATEMENT

The present application hereby claims priority under 35 U.S.C. § 119 to Indian patent application number 201841020214 filed 30 May 2018, the entire contents of which are hereby incorporated herein by reference.

FIELD

At least one example embodiment relates generally to cloud computing networks, and more particularly to systems and methods for scan optimization for efficient searching of files across different block storage volumes in a cloud computing environment.

BACKGROUND

Modern businesses often rely on computer systems and computer networks for data processing. It is undesirable to experience an irretrievable loss of data in such business computer systems. Financial institutions, healthcare organizations and businesses of varied sizes need to back up their data to prevent operational headaches and major setbacks. To prevent loss of data, computer systems are periodically backed up. Backup allows recovery of data in an event such as a system crash, natural disaster, or an operator error that causes data stored on the system to be destroyed or lost.

Cloud computing is an emerging technology that allows businesses to move their applications, services and data to cloud-computing provider networks. The businesses/users may avoid expenses associated with maintaining computer systems and networks and other operational costs. The cloud-computing provider networks thus offer an efficient way to manage costs of open systems, centralize information, and reduce energy and operational costs.

Typically, in such cloud computing environment and cloud-based storage systems, block storage volumes may be used to store data. From time-to-time snapshots of these block storage volumes may be obtained and stored. However, most of these providers do not have a solution to search for a file across volume snapshots. In general, file search is a manual multi-step cumbersome activity that involves first accessing the snapshot data and then scanning for a file in the snapshot data. Moreover, depending on the snapshot data, a file scan could be a resource and time intensive activity. In some cases, every file search may involve iterating over large number of block storage volume snapshots.

Thus, there is a need for faster, more efficient scanning techniques that would facilitate efficient searching of files across different block storage volumes in a cloud computing environment.

SUMMARY

The following summary is illustrative only and is not intended to be in any way limiting. In addition to the illustrative aspects, example embodiments, and features described, further aspects, example embodiments, and features will become apparent by reference to the drawings and the following detailed description. Example embodiments provide an index-based smart scan system.

Briefly, according to an example embodiment, an index-based smart scan system for a cloud-computing provider network is provided. The system includes a memory having computer-readable instructions stored therein and a snapshot repository configured to store a plurality of snapshots of a plurality of block storage volumes. Each of the plurality of block storage volumes is configured to perform volume based block storage operations for the cloud-computing provider network. The system further includes a processor communicatively coupled to the snapshot repository. The processor is configured to access contents of each of the plurality of snapshots. Each of the plurality of snapshots includes a point-in-time capture of the respective block storage volume. In addition, the processor is configured to perform a full scan of each of the plurality of snapshots to identify one or more files of the respective block storage volume. The processor is further configured to generate a folder index table for each of the files based upon the scan. The folder index table includes a listing of the file path and an associated modification time for each of the files. Furthermore, the processor is configured to update the folder index table over a pre-determined period of time and locate a file in the plurality of block storage volumes based on the folder index table.

According to another example embodiment, an index-based smart scan system for a cloud-computing provider network is provided. The system includes a memory having computer-readable instructions stored therein. The system further includes a snapshot repository configured to store a plurality of snapshots of a plurality of block storage volumes. In addition, the system includes a processor communicatively coupled to the snapshot repository. The processor is configured to access contents of each of the plurality of snapshots. Each of the plurality of snapshots includes a point-in-time capture of the respective block storage volume. In addition, the processor is configured to access a folder index table for each of snapshots. The folder index table includes a listing of the file path and an associated modification time for one of more files present in each of the block storage volume. The processor is further configured to scan and identify one or more modified files from each of the snapshots. The processor is configured to update the folder index table for each of the plurality of files based upon the scan. Further, the processor is configured to identify one or more snapshots for the full scan based upon the folder index table. Furthermore, the processor is configured to perform a full scan of the identified snapshots.

According to yet another embodiment, a method for performing an index-based scan for a cloud-computing provider network is provided. The method includes accessing contents of a plurality of snapshots of a plurality of block storage volumes. The block storage volumes are configured to perform volume based block storage operations for the cloud-computing provider network. The method further includes generating a folder index table for each of the files present in the respective block storage volumes based upon the scan. The folder index table comprises a listing of the file path and an associated modification time for each of the files. In addition, the method includes scanning and identifying one or more modified files from each of the snapshots. Further, the method includes updating the folder index table for each of the plurality of files based upon the scan and identifying one or more files for the full scan based upon the folder index table. Furthermore, the method includes performing a full scan of the identified files present on the block storage volume.

BRIEF DESCRIPTION OF THE FIGURES

These and other features, aspects, and advantages of the example embodiments will become better understood when the following detailed description is read with reference to the accompanying drawings in which like characters represent like parts throughout the drawings, wherein:

FIG. 3 is an illustration of generation of folder index table with details of files extracted from a snapshot using the index-based smart scan system of FIG. 1, implemented according to the aspects of present technique;

FIG. 4-A through FIG. 4-C illustrate example embodiments of identifying and scanning the files using the folder index table in combination with an age-based scan technique, implemented according to the present technique.

DETAILED DESCRIPTION OF EXAMPLE EMBODIMENTS

Figure 1:
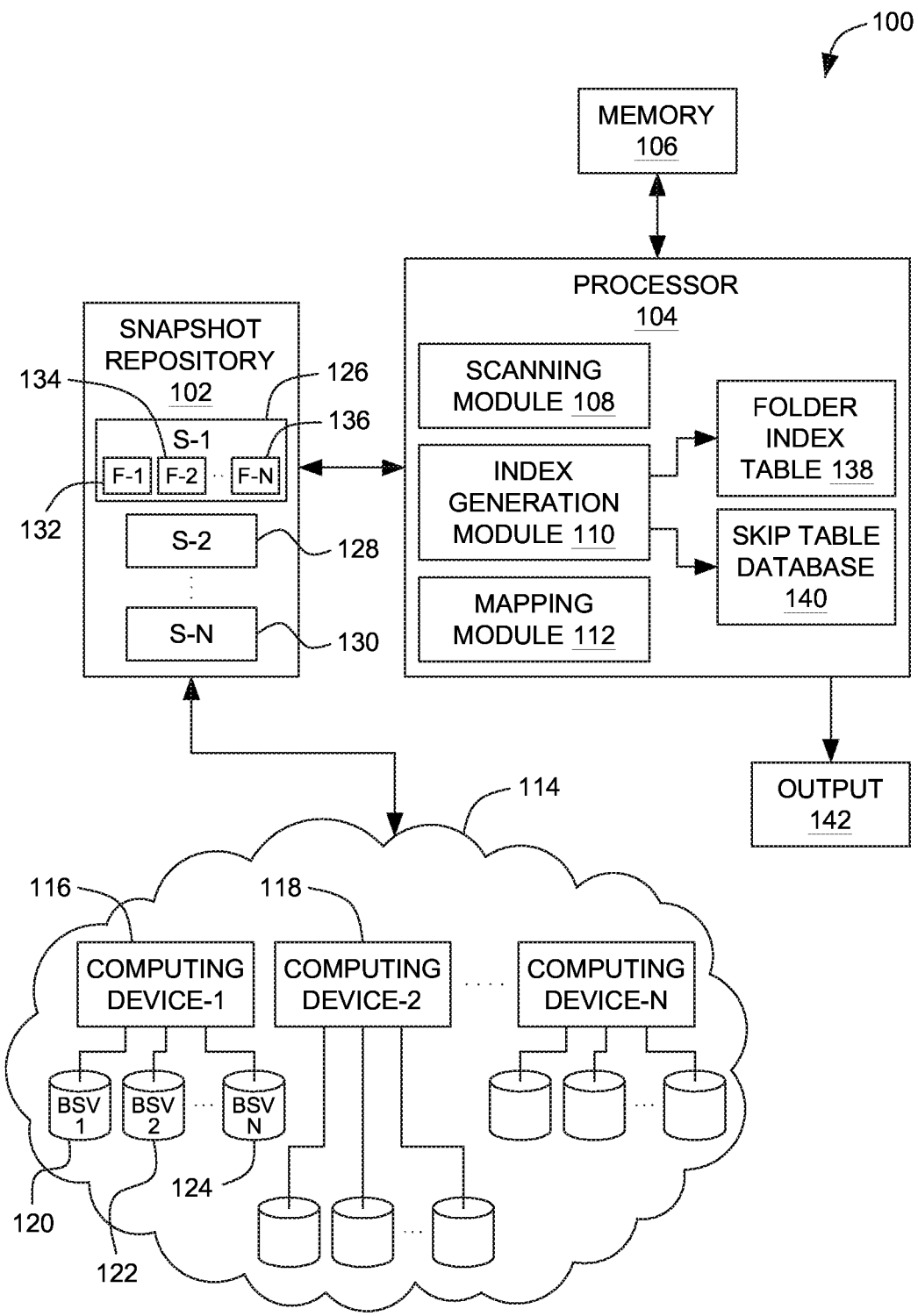
FIG. 1 is an example illustration of an index-based smart scan system, implemented according to aspects of present technique.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Various example embodiments will now be described more fully with reference to the accompanying drawings in which only some example embodiments are shown. Specific structural and functional details disclosed herein are merely representative for purposes of describing example embodiments. Example embodiments, however, may be embodied in many alternate forms and should not be construed as limited to only the example embodiments set forth herein.

Accordingly, while example embodiments are capable of various modifications and alternative forms, example embodiments are shown by way of example in the drawings and will herein be described in detail. It should be understood, however, that there is no intent to limit example embodiments to the particular forms disclosed. On the contrary, example embodiments are to cover all modifications, equivalents, and alternatives thereof. Like numbers refer to like elements throughout the description of the figures.

Before discussing example embodiments in more detail, it is noted that some example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed but may also have additional steps not included in the figure. The processes may correspond to methods, functions, procedures, subroutines, subprograms, etc.

Specific structural and functional details disclosed herein are merely representative for purposes of describing example embodiments. Inventive concepts may, however, be embodied in many alternate forms and should not be construed as limited to only the example embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or," includes any and all combinations of one or more of the associated listed items. The phrase "at least one of" has the same meaning as "and/or".

Further, although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or section. Thus, a first element, component, region, layer, or section discussed below could be termed a second element, component, region, layer, or section without departing from the scope of inventive concepts.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular example embodiments only and is not intended to be limiting. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, term such as "below" may encompass both an orientation of above and below. The device may be otherwise oriented (rotated 90 degrees or at other orientations) and the spatially relative descriptors used herein are interpreted accordingly.

Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

The device(s)/apparatus(es), described herein, may be realized by hardware elements, software elements and/or combinations thereof. For example, the devices and components illustrated in the example embodiments of inventive concepts may be implemented in one or more general-use computers or special-purpose computers, such as a processor, a controller, an arithmetic logic unit (ALU), a digital signal processor, a microcomputer, a field programmable array (FPA), a programmable logic unit (PLU), a microprocessor or any device which may execute instructions and respond. A central processing unit may implement an operating system (OS) or one or software applications running on the OS. Further, the processing unit may access, store, manipulate, process and generate data in response to execution of software. It will be understood by those skilled in the art that although a single processing unit may be illustrated for convenience of understanding, the processing unit may include a plurality of processing elements and/or a plurality of types of processing elements. For example, the central processing unit may include a plurality of processors or one processor and one controller. Also, the processing unit may have a different processing configuration, such as a parallel processor.

Software may include computer programs, codes, instructions or one or more combinations thereof and may configure a processing unit to operate in a desired manner or may independently or collectively control the processing unit. Software and/or data may be permanently or temporarily embodied in any type of machine, components, physical equipment, virtual equipment, computer storage media or units or transmitted signal waves so as to be interpreted by the processing unit or to provide instructions or data to the processing unit. Software may be dispersed throughout computer systems connected via networks and may be stored or executed in a dispersion manner. Software and data may be recorded in one or more computer-readable storage media.

The methods according to the above-described example embodiments of the inventive concept may be implemented with program instructions which may be executed by computer or processor and may be recorded in computer-readable media. The media may also include, alone or in combination with the program instructions, data files, data structures, and the like. The program instructions recorded in the media may be designed and configured especially for the example embodiments of the inventive concept or be known and available to those skilled in computer software. Computer-readable media include magnetic media such as hard disks, floppy disks, and magnetic tape; optical media such as compact disc-read only memory (CD-ROM) disks and digital versatile discs (DVDs); magneto-optical media such as floptical disks; and hardware devices that are specially configured to store and perform program instructions, such as read-only memory (ROM), random access memory (RAM), flash memory, and the like. Program instructions include both machine codes, such as produced by a compiler, and higher level codes that may be executed by the computer using an interpreter. The described hardware devices may be configured to execute one or more software modules to perform the operations of the above-described example embodiments of the inventive concept, or vice versa.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

At least one example embodiment is generally directed to an index-based smart scan system and method for scanning files such as in a cloud computing environment. It should be noted that the techniques described herein may be applicable to a wide variety of cloud-based systems with block storage services such as Amazon Web Services (AWS).

FIG. 1 is an example illustration of an index-based smart scan system 100, implemented according to aspects of present technique. The index-based smart scan system 100 includes a snapshot repository 102, a processor 104 and a memory 106. The processor 104 further includes a scanning module 108, an index generation module 110 and a mapping module 112.

In the illustrated embodiment the system 100 is configured to scan files of a cloud-computing provider network 114 having a plurality of computing devices such as generally represented by reference numerals 116 and 118. In the illustrated embodiment, the plurality of computing devices such as 116 and 118 implement a block storage service to perform volume based block storage operations using a plurality of block storage volumes BSV-1 through BSV-N such as generally represented by reference numerals 120, 122 and 124.

In this example, the snapshot repository 102 may be a cloud storage server configured to store a plurality of snapshots such as S-1 through S-N generally represented here by reference numerals 126, 128 and 130 of the block storage volumes (e.g., 120, 122 and 124).

The processor 104 is communicatively coupled to the snapshot repository 102 and is configured to access contents of each of the plurality of snapshots S-1 through S-N (e.g., 126, 128 and 130) stored in the snapshot repository 102. As used herein, the term "snapshot" refers to a point-in-time capture of the respective block storage volume. In this example, the processor 104 is configured to create a computing instance of each of the plurality of snapshots (e.g., 126, 128 and 130). Further, a corresponding block storage volume (e.g., 120) is created from each snapshot and attached to the computing instance. Moreover, the processor 104 is configured to mount the block storage volume BSV-1 (e.g., 120) to the computing instance to access the contents of the respective snapshot (e.g., 126). Further, the block storage volume 120 may be subsequently unmounted from the computing instance and the block storage volume 120 may be detached from the computing instance. The block storage volume 120 and the computing instance may be then deleted and access to the contents of the corresponding snapshot may be removed.

The processor 104 is further configured to perform a full scan of each of the plurality of snapshots (e.g., 126, 128 and 130) to identify one or more files of the respective block storage volume (e.g., 120, 122 and 124). In the illustrated embodiment, the scanning module 108 is configured to perform a full scan each of the plurality of snapshots such as S-1 through S-N (e.g., 126, 128 and 130) to identify the one or more modified files of folders such as F-1 through F-N generally represented by reference numerals 132, 134 and 136.

In an embodiment, an initial full scan is performed for all the files of the folders F-1 through F-N (e.g., 132, 134 and 136) for each of the plurality of snapshots (e.g., 126, 128 and 130) present in the snapshot repository 102. The processor 104 is further configured to compare the size of each of the plurality of snapshots (e.g., 126, 128 and 130) with a pre-determined threshold to evaluate whether a full scan of the snapshots (e.g., 126, 128 and 130) is required. Further, the full scan of the snapshots (e.g., 126, 128 and 130) may be performed if the size of the snapshots (e.g., 126, 128 and 130) is within the pre-determined threshold. In another embodiment, a scan is performed on snapshots to which files have been either recently added or modified.

The index generation module 110 is configured to generate a folder index table 138 for each of the plurality of files of the folders F-1 through F-N (e.g., 132, 134 and 136) present in each of the plurality of the snapshots S-1 through S-N (e.g., 126, 128 and 130) based upon the scan. In this embodiment, the folder index table 138 may include a listing of the file path and an associated modification time for each of the files of the folders (e.g., 132, 134 and 136). In addition, the folder index table 138 may include details such as a file name, a file modified time, a folder path, or combinations thereof for each of the files of the folders (e.g., 132, 134 and 136). In an embodiment, the index generation module 110 is configured to update the folder index table 138 for each of the plurality of files of the folders (e.g., 132, 134 and 136) based upon the scan. In this embodiment, the folder index table 138 may be updated over a pre-determined period of time.

In operation, once the folder index table 138 is generated based upon the full scan of each of the snapshots (e.g., 126, 128 and 130), it may be used to locate the files of the folders (e.g., 132, 134 and 136). Here, each file path present in the folder index table 138 is scanned to verify a change in the modified time. In case the modified time of the files has changed, then all the files present in the respective snapshot are scanned using the scanning module 108. Alternatively, scanning of the files under the respective snapshot is skipped. The processor 104 is configured to access the contents of each of the plurality of snapshots (e.g., 126, 128 and 130) and to scan and identify one or more modified files of the folders (e.g., 132, 134 and 136) from each of the snapshots (e.g., 126, 128 and 130). The processor 104 is further configured to update the folder index table 138 with such information.

In another embodiment, the index generation module 110 is configured to generate a skip table database 140 based upon the modification time of each of the files of the folders F-1 through F-N (e.g., 132, 134 and 136) present in each snapshot. In this example embodiment, the skip table database 140 includes a listing of one or more snapshots to be skipped from a full scan. In particular, the files/snapshots that have not been modified for a substantially long period may be skipped from the full scan. The memory 106 is configured to store the folder index table 138 and the skip table database 140. These may be displayed to a user of the system 100 via an output 142.

The mapping module 112 is configured to identify one or more snapshots (e.g., 126, 128 and 130) based upon the folder index table 138 and the skip table database 140. Such identified one or more snapshots (e.g., 126, 128 and 130) are accessed by the scanning module 108 for a full scan. The scanning module 106 may be configured to perform a complete backup scan of the identified snapshots (e.g., 126, 128 and 130) present on the block storage volumes (e.g., 120, 122 and 124).

In one embodiment, additional snapshots are identified for scan based upon the modification time of the files listed in the skip table database 140. In some embodiments, one or more files may be selected for backup scan based on a system defined criteria such as age-based scan criteria. In one example, the age-based scan criteria include a user-defined probability based algorithm. In another example, folders not identified for scan may include files whose loss would not be critical to the operation of the user system, or the business of the user. In one example, one or more files of the folders (e.g., 132, 134 and 136) are removed from the skip table database 140 based upon the modification time of the files of the folders (e.g., 132, 134 and 136). Further, listing of the one or more removed files are added to the folder index table 138.

The folder index table 138 is used to locate the files of the folders (e.g., 132, 134 and 136) in the plurality of block storage volumes (e.g., 120, 122 and 124). As will be appreciated by one skilled in the art, a user of the system can refer to the folder index table to locate the details such as file path etc. without the need of scanning of all the snapshots thereby making the process more efficient and less time consuming.

While FIG. 1 illustrates and the following provides a detailed description of various components/modules of the system 100, example embodiments are not limited thereto. For example, the above-identified modules of the system 100 may be implemented via one or more processors (e.g., processor 104) where the one or more processor is configured to execute computer readable instructions stored on a memory (e.g., memory 106) to carry out the functionalities of each of the above-identified modules.

Figure 2:
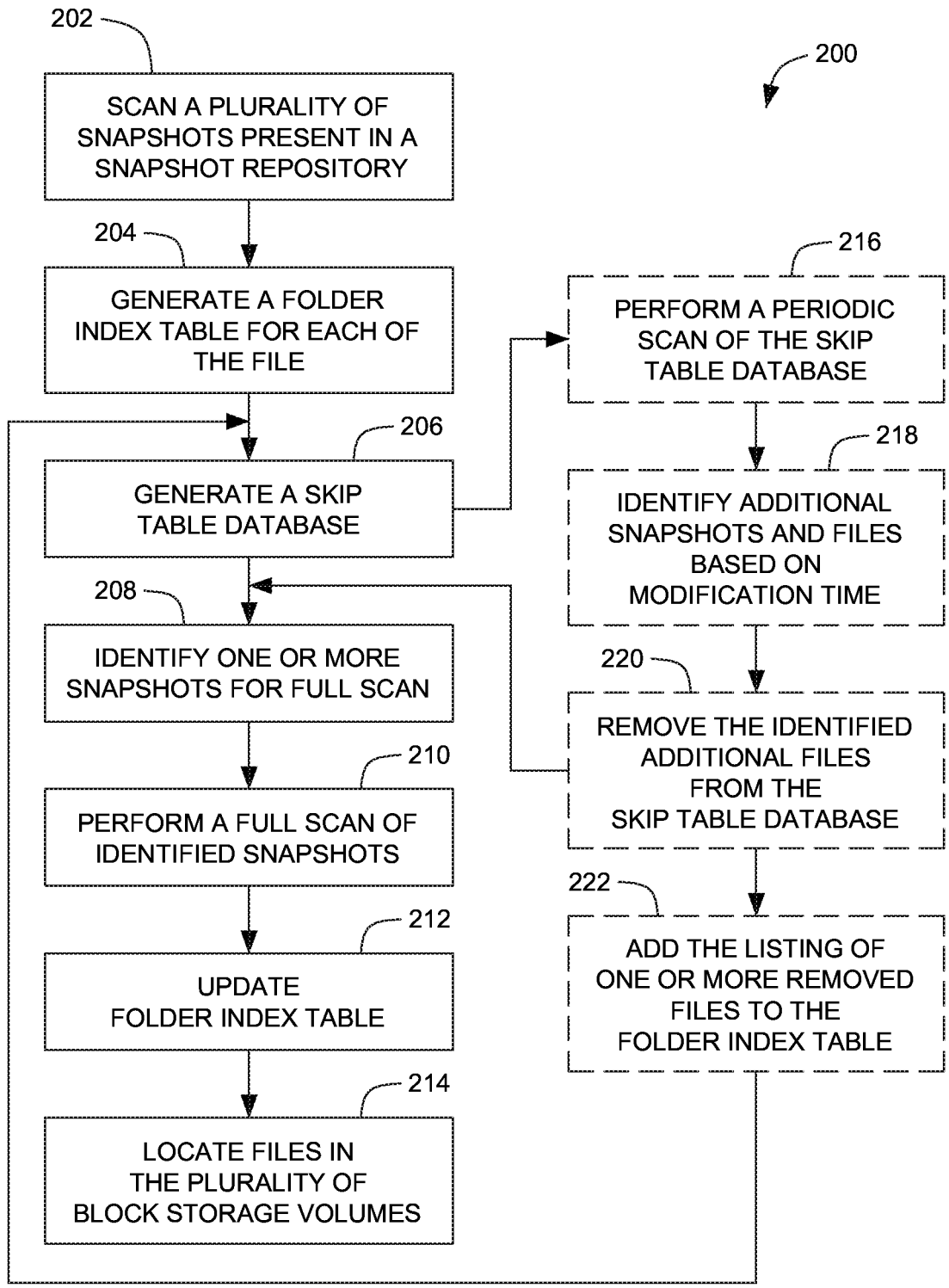
FIG. 2 is a flow diagram illustrating a process for performing an index-based scan for a cloud-computing provider network implemented using the index-based smart scan system of FIG. 1, according to an example embodiment.

FIG. 2 is a flow diagram illustrating a process 200 for performing an index-based scan for a cloud-computing provider network implemented using the index-based smart scan system of FIG. 1, according to an example embodiment.

At block 202, contents of a plurality of snapshots S-1 through S-N (e.g., 126, 128 and 130) of a plurality of block storage volumes (e.g., 120, 122 and 124) are accessed using a scanning module (e.g., scanning module 108). The block storage volumes (e.g., 120, 122 and 124) are configured to perform volume based block storage operations for the cloud-computing network 114. In an embodiment, an initial full scan is performed for all the files of the folders F-1 through F-N (e.g., 132, 134 and 136) for each of the plurality of snapshots (e.g., 126, 128 and 130) present in the snapshot repository 102. In this embodiment, the contents of the snapshots (e.g., 126, 128 and 130) are scanned to identify one or more modified files of the folders F-1 through F-N (e.g., 132, 134 and 136) of the respective block storage volumes (e.g., 120, 122 and 124).

At block 204, a folder index table (e.g., folder index table 138) for each of the plurality of files of the folders F-1 through F-N (e.g., 132, 134 and 136) is generated by an index generation module (e.g., index generation module 110). In this embodiment, the folder index table 138 may include a listing of the file path and an associated modification time for each of the files. In addition, the folder index table 138 may include details such as a file name, a file modified time, a file path, or combinations thereof for each of the files.

At block 206, a skip table database (e.g., skip table database 140) is generated by the index generation module 110 based upon a modification time of each of the files of the folders F-1 through F-N (e.g., 132, 134 and 136) present in each snapshot (e.g., 126, 128 and 130). In this example embodiment, the skip table database 140 includes a listing of one or more snapshots (e.g., 126, 128 and 130) to be skipped from a full scan. In particular, the files/snapshots that have not been modified for a substantially long period may be skipped from the full scan.

At block 208, one or more snapshots (e.g., 126, 128 and 130) are identified for full scan using a mapping module (e.g., mapping module 112) based upon the folder index table 138 and the skip table database 140. Such identified one or more snapshots (e.g., 126, 128 and 130) are accessed by the scanning module 108 for a full scan. The scanning module 108 may be configured to perform a complete backup scan of the identified snapshots (e.g., 126, 128 and 130) present on the block storage volumes (e.g., 120, 122 and 124).

At block 210, a full scan of each of the plurality of identified snapshots (e.g., 126, 128 and 130) is performed. In an embodiment, a full scan is performed of the identified snapshots (e.g., 126, 128 and 130) to identify one or more files of the folders F-1 through F-N (e.g., 132, 134 and 136) of the respective block storage volume (e.g., 120, 122 and 124). In one embodiment, one or more files are selected for backup scan based on a system defined criteria such as age-based scan criteria. In this embodiment, each folder path present in the folder activity table (e.g., folder activity table 138) is scanned to verify a change in the modified time. In another example, snapshots not identified for scan may include files whose loss would not be critical to the operation of the user system, or the business of the user/corporate where the system has been employed.

At block 212, the folder index table (e.g., folder index table 138) is updated for each of the plurality of files of the folders (e.g., 132, 134 and 136) based upon the scan of the identified snapshots.

At block 214, one or more files of the folders (e.g., 132, 134 and 136) may be located in the plurality of block storage volumes (e.g., 120, 122 and 124) using the folder index table 138.

It should be noted that once the folder index table 138 is generated, periodic scans of the snapshots (e.g., 126, 128 and 130) may be performed to update the folder index table 138 and the skip table database 140.

In the illustrated embodiment, at block 216, a periodic scan of the skip table database (e.g., skip table database 140) is performed. In this example embodiment, the skip table database 140 includes a listing of one or more snapshots (e.g., 126, 128 and 130) to be skipped from a full scan.

At step 218, additional snapshots (e.g., 126, 128 and 130) from the skip table database e.g., 140 are identified for back up scan. In an embodiment, one or more additional files of the folders (e.g., 132, 134 and 136) are identified based upon the modification time of the files of the folders (e.g., 132, 134 and 136) listed in the skip table database 140.

At block 220, one or more identified files are removed from the skip table database 140. In this embodiment, if the file modified time of a file in skip table database 140 has changed, the file is removed from skip table database 140.

At step 222, the listing of the one or more removed files from the skip table database 140 is added to the folder index table 138 that may be further selected for a full scan. As can be seen, the present technique facilitates quick and efficient searching of files present in the block storage volumes using the folder index table that is updated from time to time with the listing of file details.

FIG. 3 is an illustration 300 of generation of folder index table 138 with details of files extracted from a snapshot 126 using the index-based smart scan system 100 of FIG. 1, implemented according to the aspects of present technique. In this example, contents of a snapshot 126 is accessed to identify a plurality of files of the folders such as F-1 through F-7 generally represented here by reference numerals 302, 304, 306, 308, 310, 312 and 314. Such files of the folders are scanned using a scanning module (e.g., scanning module 108) and a full scan is performed for all the files of the folders F-1 through F-7 (e.g., 302, 304, 306, 308, 310, 312 and 314).

Here, the folder index table 138 includes a listing of the folder path 316 and an associated modified time 318. For example, for the folder F-1 302, the folder path 316 is acquired and is stored in the folder index table 138 as "C:\test" and the modified time 318 as "9/01/2017 01:47 a.m.". Similarly, for each of the folders such as F-2, F-3, F-4, F-5, F-6 and F-7 (e.g., 304, 306, 308, 310, 312 and 314), the respective folder path 316 and the modified time 318 is stored in the folder index table 138. Such details available with the folder index table 138 are used to identify the files for full back-up scan.

For example, in the illustrated embodiment, it is determined that the modified time of files of folders F-1, F-2 and F-4 (e.g., 302, 304 and 308) has changed since the last back-up scan. Therefore, a full back-up scan of files of the folders F-1, F-2 and F-4 (e.g., 302, 304 and 308) may be performed using the scanning module 108 and the other files of folders such as F-3, F-5, F-6 and F-7(e.g., 306, 310, 312 and 314) are skipped from a full scan.

Figure 5:
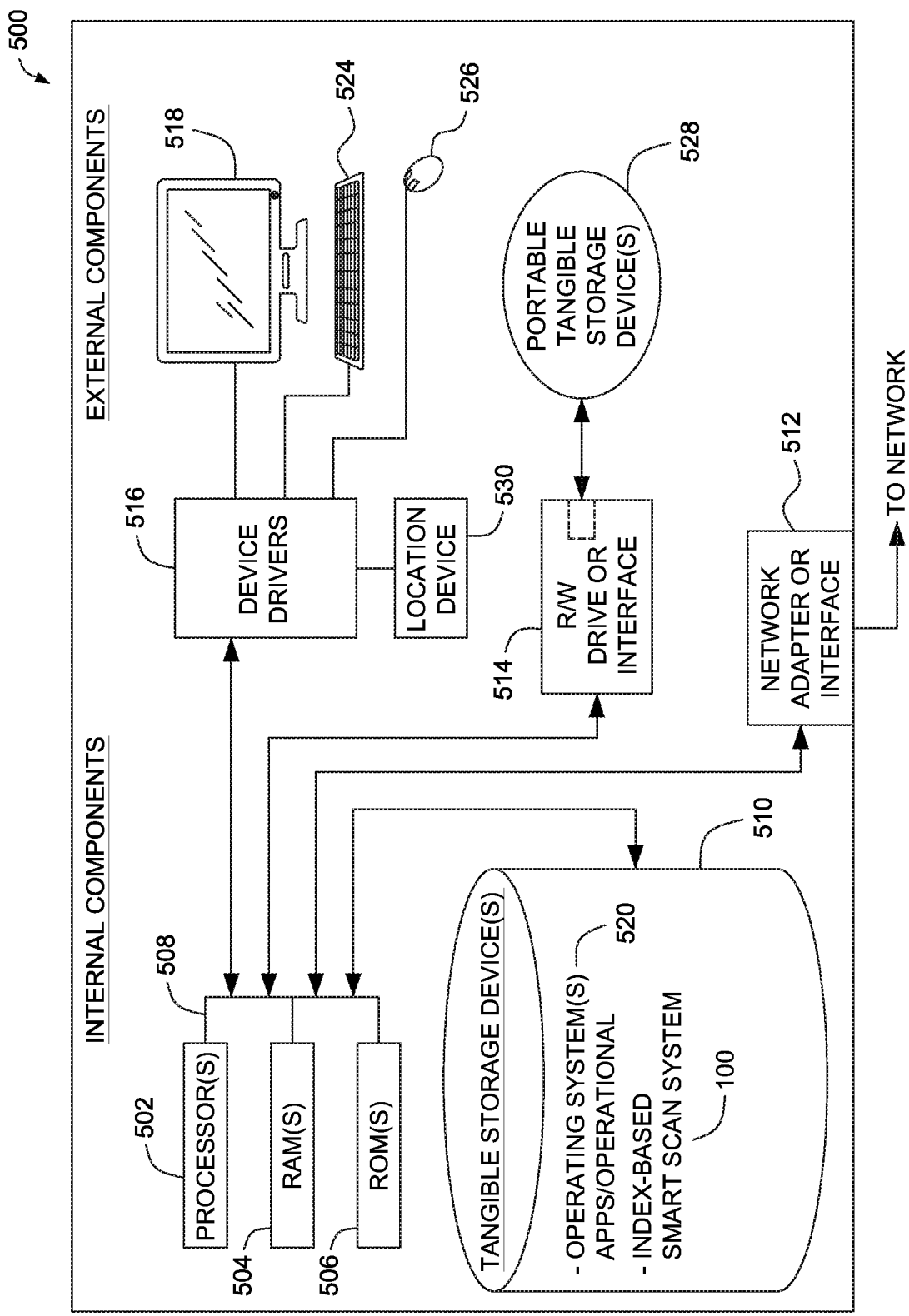
FIG. 5 is a block diagram of an embodiment of a computing device in which the modules of the index-based smart scan system, described herein, are implemented.

FIG. 4-A through FIG. 4-C illustrate example embodiments 400 of identifying and scanning the files using the folder index table in combination with an age-based scan technique, implemented according to the present technique. In an example embodiment illustrated in FIG. 5-A, files of the folders F-1 through F-7 (e.g., 302, 304, 306, 308, 310, 312 and 314) present in the snapshot 126 are identified for a backup scan based on a system defined criteria such as age-based scan techniques. Such criteria may be pre-determined by a user of the system. In an embodiment, a full scan is performed for each of folders F-1 through F-7 (e.g., 302, 304, 306, 308, 310, 312 and 314) using the scanning module (e.g., scanning module 108).

Moreover, the folders present on snapshot that have not been modified over a period of time are identified using the mapping module (e.g., mapping module 112). In an embodiment, a skip table database 140 is generated having details for one or more files of the folders F-3, F-5, F-6 and F-7 (e.g., 306, 310, 312 and 314) that have not been modified for a predetermined period of time. Such time thresholds may be user-defined. It should be noted that in age-based techniques such files may be skipped while performing a full scan.

In this embodiment, the modified time 318 of each folder F-3, F-5, F-6 and F-7 (e.g., 306, 310, 312 and 314) listed in the skip table database 140 is scanned to identify if new files were added or existing files were modified. As illustrated in FIG. 4-B, the modified time for folder F-6 (312) has changed, as represented by reference numeral 320. In this embodiment, the folder F-6 (312) is removed from the skip table database 140 and is added to the folder index table 138, as illustrated by reference numeral 322. in FIG. 4C. In another embodiment, a full scan of each of the plurality of identified files of the folders F-1, F-2, F-4 and F-6 (e.g.,302, 304, 308, 312) listed in the folder index table 138 is performed, while the scanning of the files of the folders F-3, F-5 and F-7(e.g., 306, 310 and 314) present in the skip table database 140 are skipped.

The present techniques provide an efficient way of scanning the folders present in a system. In particular, a full scan of a data set may be performed in the first backup scan and subsequent backup scans may be done using the smart scan techniques described above.

The modules of the index-based smart scan system 100 described herein are implemented in computing devices. One example of a computing device 500 is described below in FIG. 5. The computing device includes one or more processor 502, one or more computer-readable RAMs 504 and one or more computer-readable ROMs 506 on one or more buses 508. Further, computing device 500 includes a tangible storage device 510 that may be used to execute operating systems 520 and the index-based smart scan system 100. The various modules of the index-based smart scan system 100 includes a snapshot repository 102, a processor 104 and a memory 106. The processor 104 further includes a scanning module 108, an index generation module 110 and a mapping module 112. The modules may be stored in tangible storage device 510. Both, the operating system 520 and the system 100 are executed by processor 502 via one or more respective RAMs 504 (which typically include cache memory). The execution of the operating system 520 and/or the system 100 by the processor 502, configures the processor 502 as a special purpose processor configured to carry out the functionalities of the operation system 520 and/or the index-based smart scan system 100, as described above.

Examples of storage devices 528 include semiconductor storage devices devices such as ROM 506, EPROM, flash memory or any other computer-readable tangible storage device that may store a computer program and digital information.

Computing device also includes a R/W drive or interface 514 to read from and write to one or more portable computer-readable tangible storage devices 528 such as a CD-ROM, DVD, memory stick or semiconductor storage device. Further, network adapters or interfaces 512 such as a TCP/IP adapter cards, wireless Wi-Fi interface cards, or 3G or 4G wireless interface cards or other wired or wireless communication links are also included in computing device.

In one example embodiment, the index-based smart scan system 100 which includes a snapshot repository 102, a processor 104 and a memory 106. The processor 104 further includes a scanning module 108, an index generation module 110 and a mapping module 112., may be stored in tangible storage device 528 and may be downloaded from an external computer via a network (for example, the Internet, a local area network or other, wide area network) and network adapter or interface 512.

Computing device further includes device drivers 516 to interface with input and output devices. The input and output devices may include a computer display monitor 518, a keyboard 524, a keypad, a touch screen, a computer mouse 526, and/or some other suitable input device.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present.

For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

While only certain features of several embodiments have been illustrated, and described herein, many modifications and changes will occur to those skilled in the art. It is, therefore, to be understood that the appended claims are intended to cover all such modifications and changes as fall within the true spirit of inventive concepts.

The afore mentioned description is merely illustrative in nature and is in no way intended to limit the disclosure, its application, or uses. The broad teachings of the disclosure may be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the example embodiments is described above as having certain features, any one or more of those features described with respect to any example embodiment of the disclosure may be implemented in and/or combined with features of any of the other embodiments, even if that combination is not explicitly described. In other words, the described example embodiments are not mutually exclusive, and permutations of one or more example embodiments with one another remain within the scope of this disclosure.

The invention claimed is:

1. An index-based smart scan system for a cloud-computing provider network, the system comprising:
    a memory having computer-readable instructions stored therein;
    a snapshot repository configured to store a plurality of snapshots of a plurality of block storage volumes, wherein each of the plurality of block storage volumes is configured to perform volume based block storage operations for the cloud-computing provider network; and
    a processor communicatively coupled to the snapshot repository, wherein the processor is configured to:
        access contents of each of the plurality of snapshots, wherein each of the plurality of snapshots comprises a point-in-time capture of the respective block storage volume;
        perform a full scan of each of the plurality of snapshots to identify a plurality of files of the respective block storage volume;
        generate a folder index table for each of the files based upon the scan, wherein the folder index table comprises a listing of a file path and a modification time for each of the files;
        generate a skip table database based upon the modification time of each of the files, wherein the skip table database comprises a listing of one or more snapshots to be skipped from a full scan;
        identify one or more snapshots for the full scan based upon the folder index table and the skip table database;
        perform a full scan of the identified snapshots present on the respective block storage volume;
        update the folder index table for the modified file over a pre-determined period of time; and
        locate a file in the plurality of block storage volumes based on the folder index table.

2. The index-based smart scan system of claim 1, wherein the system is configured to scan the files of the cloud-computing provider network having a plurality of computing devices, wherein the plurality of computing devices implements a block storage service to perform volume based block storage operations using the plurality of block storage volumes.

3. The index-based smart scan system of claim 1, wherein the processor is further configured to:
    compare the size of each of the plurality of snapshots with a pre-determined threshold to evaluate whether a full scan of the snapshots is required; and
    perform the full scan if the size of the snapshots is within the pre-determined threshold.

4. The system of claim 1, wherein the processor is further configured to:
    create a computing instance of each of the plurality of snapshots;
    create a corresponding block storage volume from each snapshot;
    attach the corresponding block storage volume to the computing instance;
    mount the block storage volume to the computing instance; and
    access the contents of the respective snapshot.

5. The system of claim 4, wherein the processor is further configured to:
    unmount the block storage volume from the computing instance;
    detach the block storage volume from the computing instance;
    delete the block storage volume and the computing instance; and
    remove access to the contents of the corresponding snapshot.

6. The system of claim 1, wherein the processor is further configured to execute the computer-readable instructions to:
    select files for a backup scan based upon an age based scan criteria; and
    scan each file path present in the folder index table to verify a change in the modified time.

7. The system of claim 6, wherein the age based scan criteria comprises a user-defined probability based algorithm.

8. The system of claim 1, wherein the memory is further configured to store the folder index table and skip table database for details of the files present in each snapshot.

9. The system of claim 8, wherein the processor is further configured to execute the computer-readable instructions to:
    remove one or more files from the skip table database based upon the modification time of the folders; and
    add listing of the one or more removed files to the folder index table.

10. The system of claim 1, wherein the folder index table comprises a file name, a file modified time, a folder path, or combinations thereof for each of the files.

11. An index-based smart scan system for a cloud-computing provider network, the system comprising:
    a memory having computer-readable instructions stored therein;
    a snapshot repository configured to store a plurality of snapshots of a plurality of block storage volumes; and
    a processor communicatively coupled to the snapshot repository, wherein the processor is configured to:
        access contents of each of the plurality of snapshots, wherein each of the plurality of snapshots comprises a point-in-time capture of the respective block storage volume;
        access a folder index table for each of snapshots, wherein the folder index table comprises a listing of a file path and a modification time for a plurality of files present in each of the block storage volume;
        generate a skip table database based upon the modification time of each of the files, wherein the skip table database comprises a listing of one or more snapshots to be skipped from a full scan;
scan and identify, based on the skip table database, one or more modified files from each of the snapshots;
update the folder index table for each of the modified files based upon the scan;
identify one or more snapshots for a full scan of snapshots based upon the folder index table; and
perform a full scan of the identified snapshots.

12. The index-based smart scan system of claim 11, wherein the processor is further configured to perform a full scan of each of the plurality of snapshots to identify the one or more files of the respective block storage volume to generate the folder index table.

13. The index-based smart scan system of claim 11, wherein the folder index table comprises a file name, a file modified time, a file path, or combinations thereof for each of the files.

14. The index-based smart scan system of claim 11, wherein the processor is further configured to execute the computer-readable instructions to identify one or more files of the respective block storage volume for the full scan based upon the skip table database.

15. The index-based smart scan system of claim 11, wherein the processor is further configured to execute the computer-readable instructions to:
perform a periodic scan of the skip table database;
identify additional snapshots for scan based upon the modification time of the files listed in skip table database;
remove the additional files from the skip table database; and
add listing of the one or more removed files to the folder index table.

16. The index-based smart scan system of claim 11, wherein the processor is further configured to execute the computer-readable instructions to:
select files for a backup scan based upon an age based scan criteria; and
scan each file path present in the folder index table to verify a change in the modified time.

17. A method for performing an index-based scan for a cloud-computing provider network, the method comprising:
accessing contents of a plurality of snapshots of a plurality of block storage volumes, wherein the block storage volumes are configured to perform volume based block storage operations for the cloud-computing provider network;
generating a folder index table for each file present in the respective block storage volumes based upon the scan, wherein the folder index table comprises a listing of a file path and a modification time for each file;
generating a skip table database based upon the modification time of each of the files, wherein the skip table database comprises a listing of one or more snapshots to be skipped from a full scan;
scanning and identifying, based on the skip table database, one or more modified files from each of the snapshots;
updating the folder index table for each of the modified files based upon the scan;
identifying one or more files for a full scan of files based upon the folder index table; and
performing a full scan of the identified files present on the block storage volume.

* * * * *